US009787497B2

(12) United States Patent
Jung

(10) Patent No.: US 9,787,497 B2
(45) Date of Patent: Oct. 10, 2017

(54) NETWORK APPARATUS AND METHOD USING LINK LAYER ROUTING

(71) Applicant: Electronics and Telecommunications Research Institute, Daejeon (KR)

(72) Inventor: Hee Young Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 168 days.

(21) Appl. No.: 14/659,917

(22) Filed: Mar. 17, 2015

(65) Prior Publication Data
US 2015/0263941 A1    Sep. 17, 2015

(30) Foreign Application Priority Data

Mar. 17, 2014  (KR) .................. 10-2014-0031109
Jul. 21, 2014  (KR) .................. 10-2014-0092128

(51) Int. Cl.
*H04L 12/46*   (2006.01)
*H04W 36/00*   (2009.01)
*H04W 80/02*   (2009.01)

(52) U.S. Cl.
CPC ....... *H04L 12/462* (2013.01); *H04W 36/0011* (2013.01); *H04L 2012/4629* (2013.01); *H04W 80/02* (2013.01)

(58) Field of Classification Search
CPC . H04L 29/08; H04L 29/08027; H04L 12/462; H04L 12/5689; H04L 12/56; H04L 45/16; H04L 45/66; H04L 45/72; H04L 45/742; H04L 67/18; H04W 40/026; H04W 80/02; H04W 72/04
See application file for complete search history.

(56) References Cited

U.S. PATENT DOCUMENTS

| 7,237,722 B2 * | 7/2007 | Zhu | G06K 7/10732 235/462.01 |
| 7,630,311 B2 | 12/2009 | Jung et al. | |
| 2006/0198383 A1 * | 9/2006 | Li | H04L 12/4625 370/401 |
| 2010/0002652 A1 * | 1/2010 | Kawakami | H04W 36/0011 370/331 |
| 2011/0080872 A1 | 4/2011 | Chan et al. | |
| 2011/0142039 A1 | 6/2011 | Jung | |
| 2014/0177640 A1 * | 6/2014 | Yang | H04L 45/586 370/401 |

(Continued)

FOREIGN PATENT DOCUMENTS

CN    103746917 A  *  4/2014

OTHER PUBLICATIONS

Google translation of attached Chinese aapplication CN 103746917 A to Hui et al.; retreived from the Internet on Sep. 15, 2016.*

(Continued)

*Primary Examiner* — Benjamin H Elliott, IV
(74) *Attorney, Agent, or Firm* — William Park & Associates Ltd.

(57) ABSTRACT

A next-generation mobile communication network apparatus and method using link layer routing. The network apparatus uses an existing IP address as an identifier while using a link layer address as a locator, and utilizers a location server that manages mapping between the IP address and the link layer address, thereby providing mobility.

6 Claims, 10 Drawing Sheets

(56) References Cited

U.S. PATENT DOCUMENTS

2014/0293871 A1    10/2014  Jung
2015/0263941 A1*   9/2015   Jung .................... H04L 12/462
                                                        370/329

OTHER PUBLICATIONS

D. Liu et al., Distributed Mobility Management, Internet Draft, Jul. 10, 2010, pp. 1-16, Internet Engineering Task Force.

Khadija Daoud et al., UFA: Ultra Flat Architecture for High Bitrate Services in Mobile Networks, Orange Labs, Sep. 2008, IEEE reference No. 1569108837, Issy Les Moulineaux, France.

* cited by examiner

— Prior Art —

(AN: Access Node)

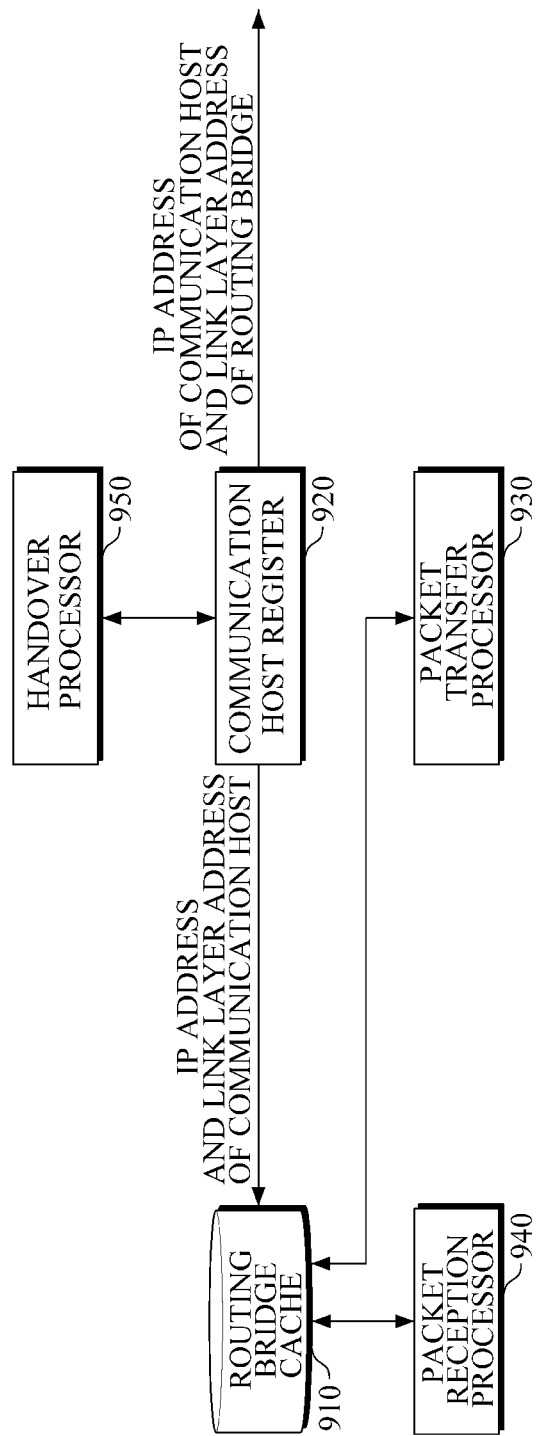

1

NETWORK APPARATUS AND METHOD USING LINK LAYER ROUTING

CROSS-REFERENCE TO RELATED APPLICATION(S)

This application claims priority from Korean Patent Application Nos. 10-2014-0031109, filed on Mar. 17, 2014, and 10-2014-0092128, filed on Jul. 21, 2014, in the Korean Intellectual Property Office, the disclosures of which are incorporated herein by references in its entirety.

BACKGROUND

1. Field

The following description relates to a mobile communication system, and more particularly, to a configuration and procedures of a next-generation mobile communication network using link layer routing.

2. Description of the Related Art

A $3^{rd}$ generation partnership project (3GPP) mobile communication network is based on a long term evolution (LTE) technology which relates to a wireless communication and an evolved packet core (EPC) technology which relates to a core network.

FIG. 1 is a diagram illustrating a configuration of a $4^{th}$ generation mobile communication network. Referring to FIG. 1, the 3GPP mobile communication network is based on LTE for a wireless network and an EPC for a core network.

The EPC consists of a serving gateway (S-GW) for packet transfer between 3GPP-based wireless technologies; a packet data network gateway (P-GW) for packet transfer in association with non-3GPP-based wireless technologies, and a mobility management entity (MME) for supporting mobility between LTE wireless technologies.

In addition, the EPC basically utilizes an Internet protocol (IP) network technology, and largely uses a general packet radio service (GPRS) tunneling protocol (GTP) tunnel between a P-GW and an S-GW for packet transfer and mobility management on a core network.

However, as data traffic is exploding, the aforementioned $4^{th}$ generation mobile communication network has the following problems.

First, according to GTP, IP packets are encapsulated, which requires additional headers, such as an external IP header, a UDP header, and a GTP header. Accordingly, 40 to 60-byte overhead is incurred in the initial IP packet, which may result in degradation of communication efficiency of a mobile communication network.

Second, the P-GW acts as a terminal end of the GTP tunnel, and if a host is moved and an S-GW is thus changed, a new GTP tunnel to a new S-GW needs to be established, which may lead to performance degradation during handover.

Third, because the P-GW acts as an anchor for all packet transfers, any packet transfer paths need to pass the P-GW even when a transmission host is in proximity, and this may cause path inefficiency and an increase in unnecessary traffic.

Fourth, since traffic concentration on the P-GW is caused because of the same reasons as the third problem, a large-capacity, expensive P-GW is required, and when the P-GW is out of order, it is impossible to transfer packets throughout the whole network and unnecessary traffic may be produced within the network.

To address the aforementioned problems, a new method, named ultra-flat architecture (UFA), has been suggested to design a flat mobile communication network without a central anchor.

FIG. 2 is a diagram illustrating a configuration of an evolved flat-mobile communication network.

Referring to FIG. 2, in the flat next-generation mobile communication network, most of network functionality is distributed to a base station side, such that access nodes (ANs) replace some of features that have been previously performed by an MME, an S-GW, and a P-GW, as well as providing wireless connectivity.

However, such a flat architecture is basically based on IP networking technologies in accordance with All-IP network paradigm, and still has limitations inherent in the IP networking technologies.

First, a great amount of cost is required to configure an IP network and establish relevant settings of a router to accord with the architecture, and to change the network architecture, if any.

Second, because an IP address is used as a locator for routing, as well as an identifier of an ongoing session, it is required to obtain a new IP address when a host is handed over, and this may cause the disconnection of the ongoing session.

To solve the aforementioned problem, some technologies to perform routing not at layer 3 but at a link layer, which is required for packet transfer between multi-hops have been suggested.

However, these technologies are only dealing with a network of limited scale, such as a campus network or a data center, and there are not yet provided any technologies that can be applied to a large scale network, such as a mobile communication network.

SUMMARY

The following description relates to a network apparatus and method using line layer routing in order to solve problems of the 4th generation mobile communication network, for example, overhead, traffic concentration, or management overhead.

In one general aspect, there is provided a routing bridge apparatus including: a routing bridge cache configured to save an IP address and link layer address of a communication host; a communication host register configured to register the IP address of the communication host and a link layer address of the routing bridge apparatus in a location server, as well as storing the IP address and link layer address of the communication host in the routing bridge cache; a packet transfer processor configured to, in response to receiving a first packet and an IP address of a first destination communication host from the communication host, obtain from the location server a link layer address of a first routing bridge apparatus to which the first destination communication host is connected, and transmit the first packet and the IP address of the first destination communication host to the first routing bridge apparatus of the obtained link layer address; and a packet reception processor configured to, in response to receiving a second packet and an IP address of a second destination communication host from a second routing bridge apparatus, search the routing bridge cache for a link layer address of the second destination communication host, and transfer the second packet to the second destination communication host.

In another general aspect, there is provided a method for transferring a packet using link layer routing in a routing bridge apparatus, the method including: receiving a packet and an IP address of a destination communication host from a communication host; obtaining from a location server a link layer address of a routing bridge apparatus to which the destination communication host is connected; and transferring the packet and the IP address of the destination communication host of the routing bridge apparatus of the obtained link layer address.

In another general aspect, there is provided a method for receiving a packet in a routing bridge apparatus, the method including: receiving a packet and an IP address of a destination communication host from another routing bridge apparatus; searching a routing bridge cache for a link layer address that is mapped to the IP address; and transferring the packet to the destination communication host using the link layer address.

In another general aspect, there is provided a method of handover between routing bridge apparatuses, the method including: in response to a communication host being handed over from a first routing bridge apparatus to a second routing bridge apparatus, transmitting, from the second routing bridge apparatus, an handover indicator to the closest routing bridge apparatus to which both the first routing bridge apparatus and the second routing bridge apparatus are all connected, wherein the handover indicator comprises an IP address of the communication host and a link layer address of the second routing bridge apparatus; and transferring, at the closest routing bridge apparatus, a packet to be transferred to the IP address of the communication host to the second routing bridge apparatus.

In yet another general aspect, there is provided a transfer method of a gateway including: receiving a packet and an IP address of a destination communication host from a communication host that is connected to the Internet; obtaining from a location server a link layer address of a routing bridge apparatus to which the destination communication host is connected; and transferring the packet and the IP address of the destination communication host to the routing bridge apparatus of the obtained link layer address.

Other features and aspects will be apparent from the following detailed description, the drawings, and the claims.

BRIEF DESCRIPTION OF THE DRAWINGS

FIG. 9 is a diagram illustrating a configuration of a routing bridge apparatus according to an exemplary embodiment.

Figure 1:
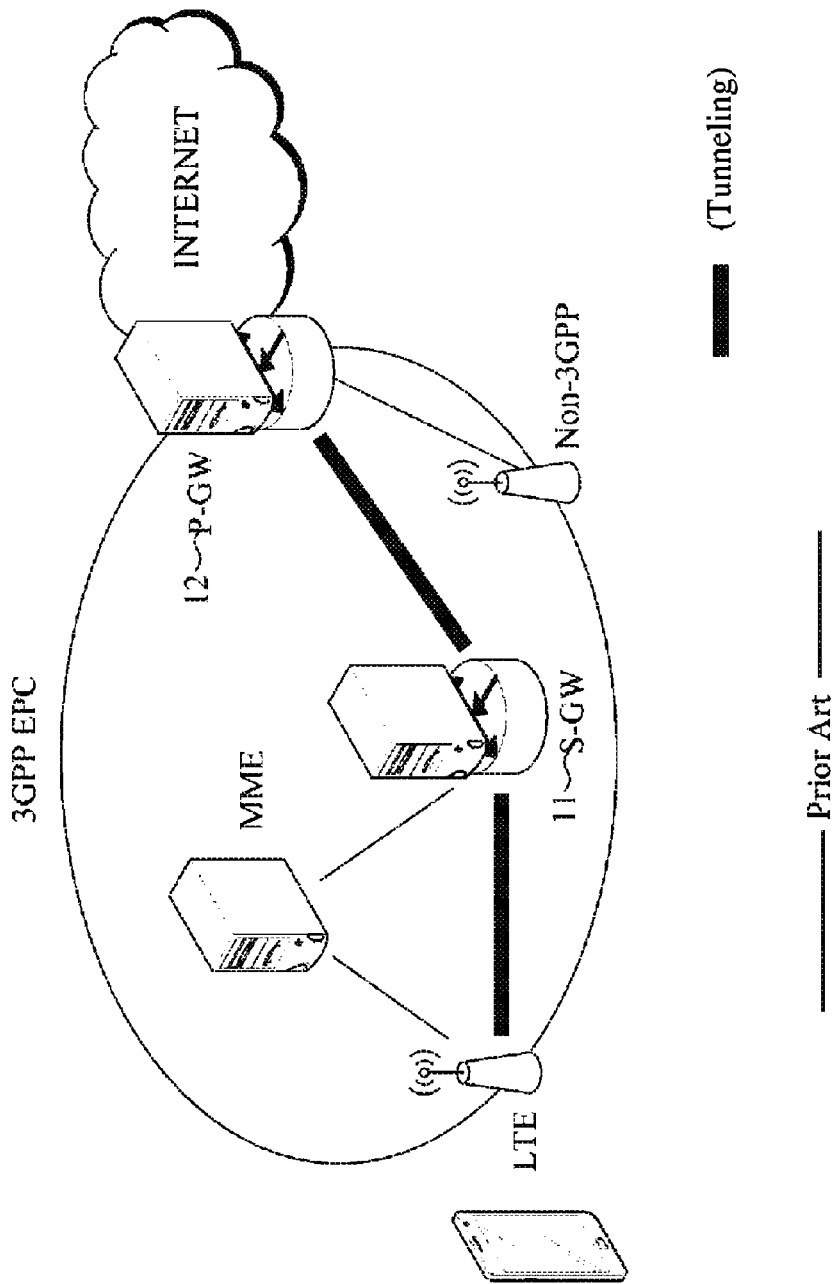
FIG. 1 is a diagram illustrating a configuration of a 4$^{th}$ generation mobile communication network.
Figure 2:
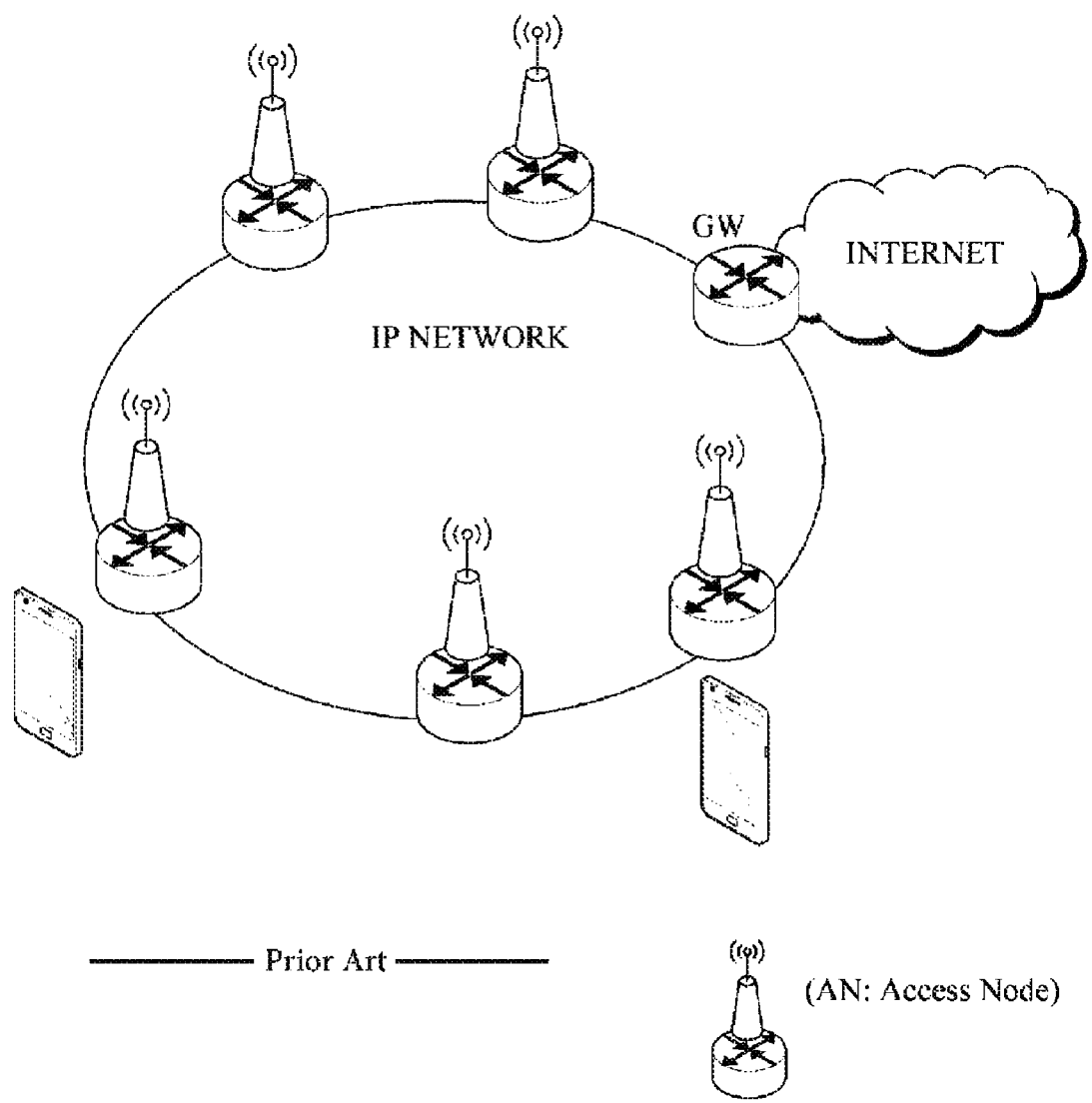
FIG. 2 is a diagram illustrating a configuration of an evolved flat-mobile communication network.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

The present disclosure relates to a packet transfer to a destination mobile communication host based on link layer routing in a mobile communication network, wherein an existing IP address is used as an identifier and a media access control (MAC) address of a link layer is used as a locator. By using such a concept, even when the mobile communication host is moving, it is possible to maintain the IP address, thereby ensuring session continuity while reducing the complexity and costs which are caused by the IP network architecture.

Figure 3:
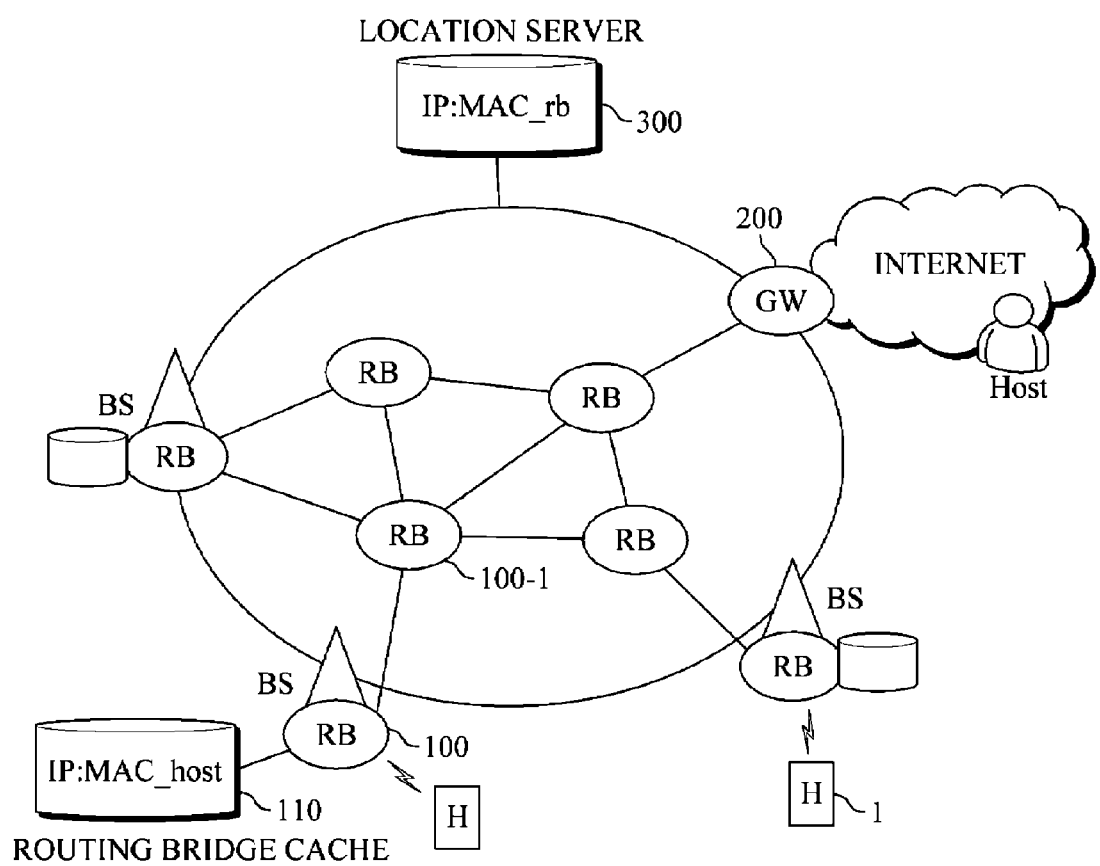
FIG. 3 is a diagram showing a concept of an identifier-based flat communication structure in accordance with an exemplary embodiment.

FIG. 3 is a diagram showing a concept of an identifier-based flat communication structure, which is only illustrated herein for purpose of example, and a network architecture which provides routing at a link layer may be structured in various forms.

Referring to FIG. 3, a network architecture includes base station (BS) nodes 100 with features of routing bridge (RB), intermediate routing bridges 100-1 to transmit packets between mobile communication networks, a gateway 200 to enable interworking between the mobile communication network and the Internet, and a location server 300 that saves mapping information of an IP address of a mobile communication host 1 and a location of a routing bridge to which the mobile communication host 1 is connected. In addition, each routing bridge 100 includes a routing bridge cache 110 that saves mapping information of the IP address of a mobile communication host and an actual link layer address of the mobile communication host. Although in FIG. 3, the routing bridge cache 110 is included in the routing bridge, it is only illustrated for purpose of example, and aspects of the present disclosure are not limited thereto.

The gateway 200 is in charge of interworking with the Internet, and specifically, in charge of signaling processing and packet buffering and forwarding for the interwork. The location server 300 registers, maintains, and manages the mapping information between an IP address of each host and a routing bridge link layer address within each mobile communication network.

The routing bridge cache 110 included in each BS routing bridge 100 registers, maintains, and manages mapping information between an IP address of the mobile communication host and a link layer address.

The routing bridges 100-1 transfers link layer packets (or frames) to a destination host using link layer address information. To this end, prerouting is required, and this prerouting procedure may be provided by the existing distributed link-state routing protocol, such as IS-IS, or a centralized control console, such as software defined network (SDN) controller.

The routing bridges 100-1 forwards packets (or frames) to a destination based on the previously set routing information as described above.

Each of the base stations 100 provides a wireless interface for the mobile communication host.

Figure 4:
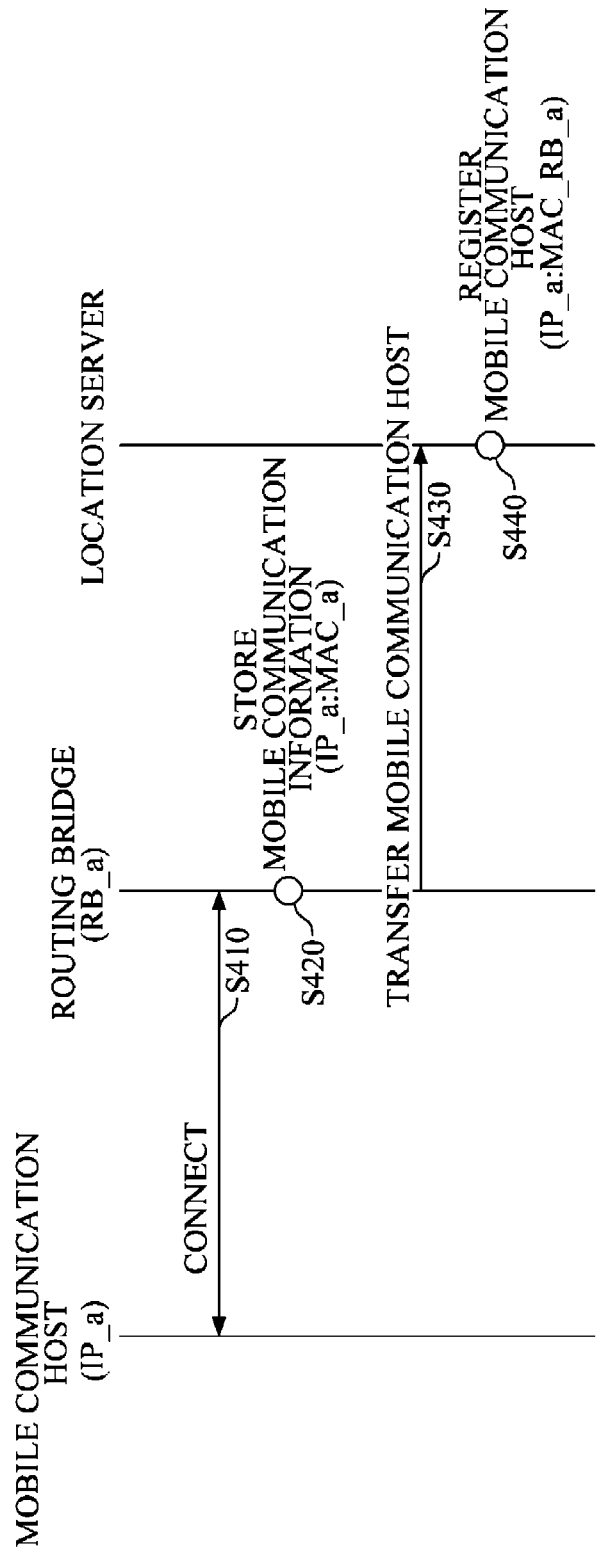
FIG. 4 is a flowchart illustrating procedures for registering a mobile communication host in accordance with an exemplary embodiment.

FIG. 4 is a flowchart illustrating procedures for registering a mobile communication host in accordance with an exemplary embodiment. The embodiment illustrated in FIG. 4 assumes that each mobile communication host has a fixed IP address, and also can be applied to a case where a mobile communication host is allocated a dynamic IP address, such as dynamic host configuration protocol (DHCP). In this case, the registration procedure may be performed in combination with an IP address acquisition procedure.

Referring to FIG. 4, when a new connection from the mobile communication host to a network is established (or the mobile communication host changes a connection point of the network), connection procedures at a link layer is performed (S410). The connection procedures at the link layer may vary depending on characteristics of each link (for example, LTE, WiFi, WiMax, etc.)

Through such connection procedures, the BS routing bridge obtains IP address information (IP_a) and link layer address information (MAC_a) of the mobile communication host, and stores the obtained information in an included routing bridge cache in S420. To this end, other procedures in addition to the existing connection procedures may be needed.

The routing bridge registers information regarding the associated mobile communication host in the location server in S430. The stored information includes an IP address (IP_a) of the mobile communication host and a link layer address (MAC_RB_a) of the routing bridge.

Figure 5:
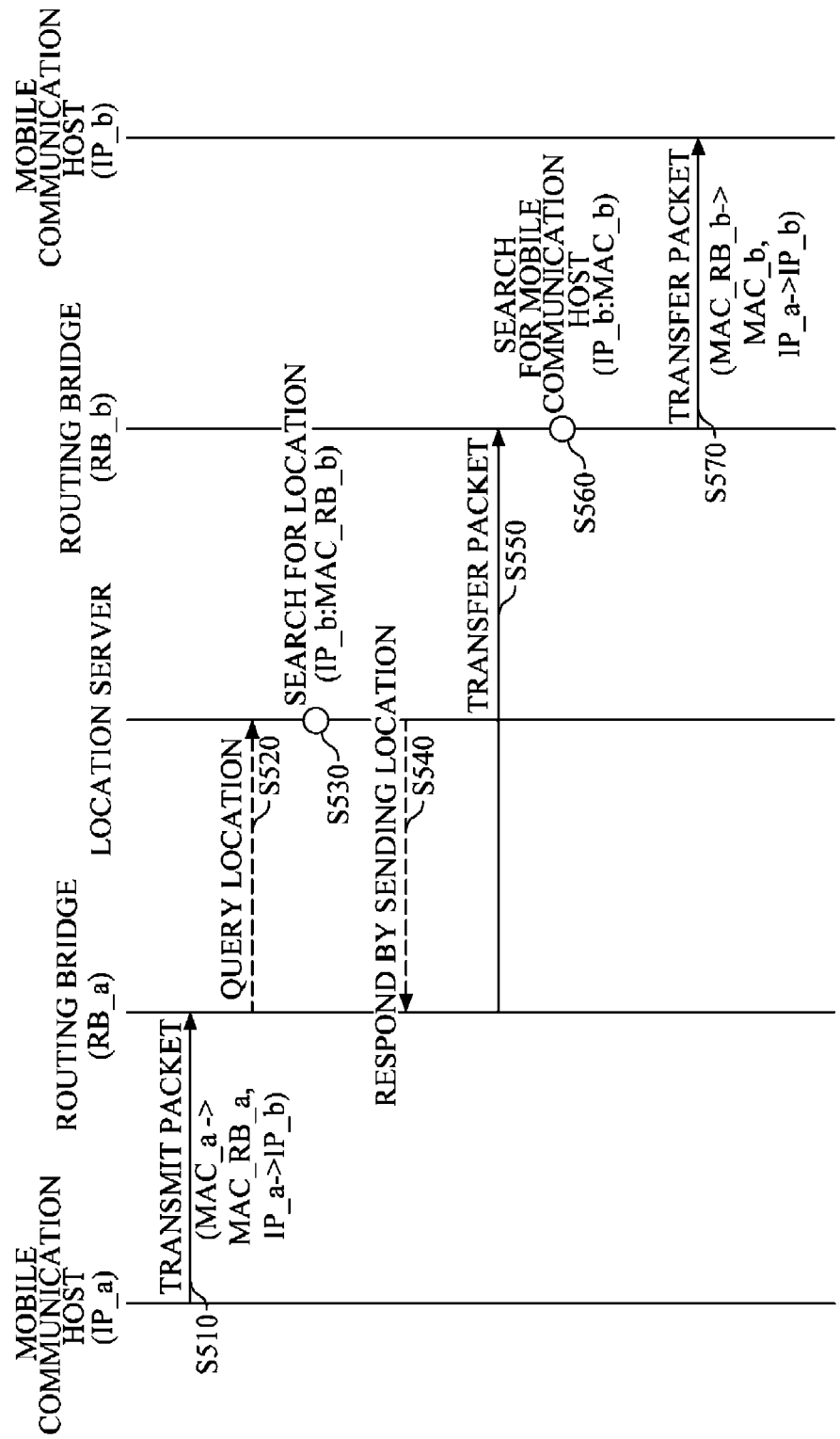
FIG. 5 is a flowchart illustrating a packet transfer method in accordance with an exemplary embodiment when a communication between mobile hosts is established within a mobile communication network.

FIG. 5 is a flowchart illustrating a packet transfer method in accordance with an exemplary embodiment when a communication between mobile hosts is established within a mobile communication network. FIG. 5 assumes that routing required for packet transfer is previously set according to a routing protocol, such as IS-IS, or by an SDN controller.

Referring to FIG. 5, a mobile communication host (MAC_a, IP_a) that intends to establish a communication with another mobile communication host (MAC_b, IP_b) transmits a packet to a BS routing bridge (RB_a) that services the mobile communication host (MAC_a, IP_a) by setting an ID, i.e., IP_b, of the correspondent mobile communication host (MAC_b, IP_b) as a destination in S510.

The BS routing bridge sends a query message to identify a location of the correspondent mobile communication host using the destination IP address (IP_b) in S520. At this time, to prevent packet loss, the BS routing bridge may buffer a transmission packet for a given period of time, which will vary in accordance with the embodiment.

In S530, the location server searches for link layer address information (MAC_RB_b) of a transmission BS routing bridge to which the mobile communication host with an address "IP_b" is connected, and responds to the routing bridge RB_a by sending the found link layer address information MAC_RB_b of the BS routing bridge in S540.

The transmission BS routing bridge transfers the packet to the receiving BS routing bridge using the link layer address information of the receiving BS routing bridge in S550.

In 560, the receiving BS routing bridge that has received the transmission packet identifies the link layer address (MAC_b) of the receiving mobile communication host using the cache information that the receiving BS routing bridge manages, and then, ultimately transfers the packet to the receiving mobile communication host in S570.

Figure 6:
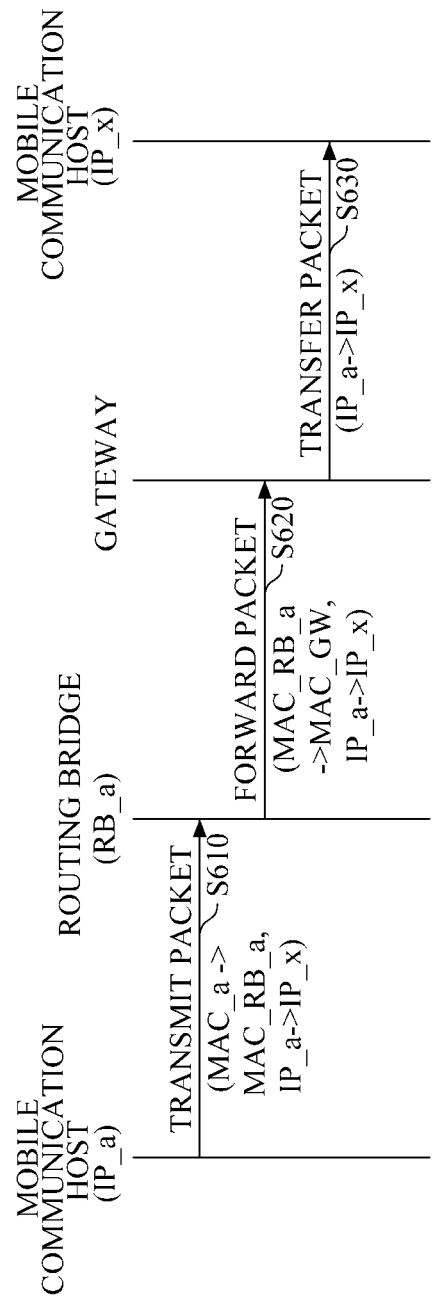
FIG. 6 is a flowchart illustrating procedures for packet transfer from a mobile communication host of a mobile communication network to an Internet communication host, according to an exemplary embodiment.

FIG. 6 is a flowchart illustrating procedures for packet transfer from a mobile communication host of a mobile communication network to an Internet communication host, according to an exemplary embodiment.

Referring to FIG. 6, the mobile communication host transmits a packet having an IP address (IP_x) of a correspondent host as a destination to a BS routing bridge in S610.

Based on prefix information of the IP address of the destination, the BS routing bridge enables to identify that the destination IP address is an external IP address, and forwards the destination IP address to a gateway in S620.

The gateway transfers the packet to a destination host through standard IP routing to the destination IP address in S630.

Figure 7:
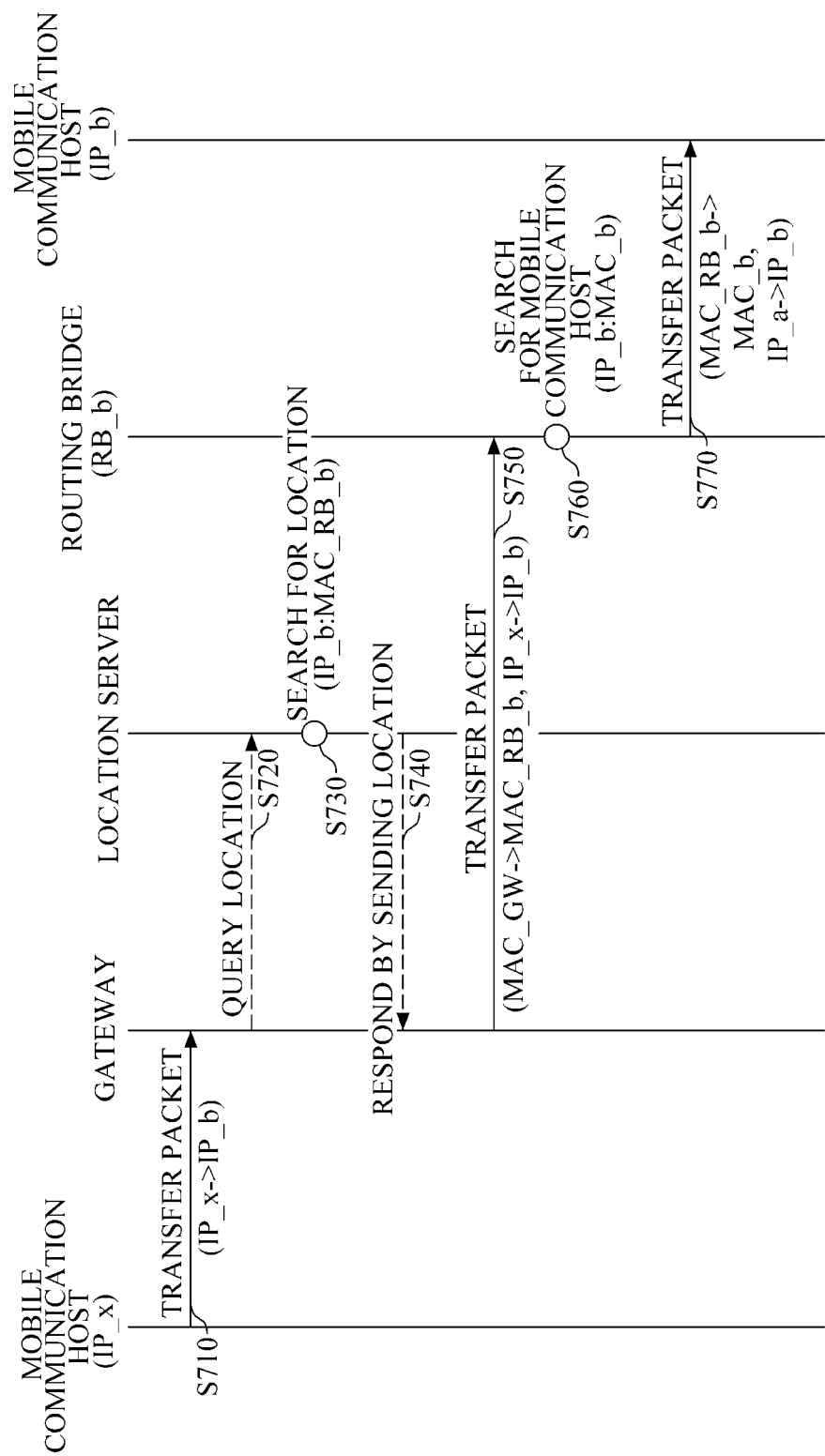
FIG. 7 is a flowchart illustrating procedures for packet transfer from an Internet host to a mobile communication host in a mobile communication network according to an exemplary embodiment.

FIG. 7 is a flowchart illustrating procedures for packet transfer from an Internet host to a mobile communication host in a mobile communication network according to an exemplary embodiment.

Referring to FIG. 7, the Internet host (IP_x) transfers a packet to a gateway of the mobile communication network through IP routing using an already known IP address (IP_b) of a correspondent mobile communication host in S710.

The gateway queries a location server for a link layer address of a routing bridge that services the receiving mobile communication host using the IP address (IP_b) of the receiving mobile communication host in S720.

In this embodiment, it is assumed that the mobile communication host has a fixed IP address (i.e., IP_b in the drawing). If the mobile communication host has a dynamic IP address, such as dynamic host configuration protocol (DHCP) address, the Internet host may require an additional means to recognize the mobile communication host. For example, the mobile communication host may additionally employ a naming server that recognizes the mobile communication host as a fixed name, such as phone number, and maps the mobile communication host to a dynamic IP address. Here, fixed phone number may be a fixed IP address.

The location server searches for a routing bridge link layer address "MAC_RB_b" in relation to the IP address "IP_b" in S730, and responds to the query by sending the found routing bridge link layer address "MAC_RB_b" in S740.

The gateway transfers the packet to a routing bridge at the receiving end using the received address in S750.

Then, the routing bridge at the receiving end searches for a mobile communication host by using cache information managed by the routing bridge in S760, and then transfers the packet to the found mobile communication host in S770.

Figure 8A:
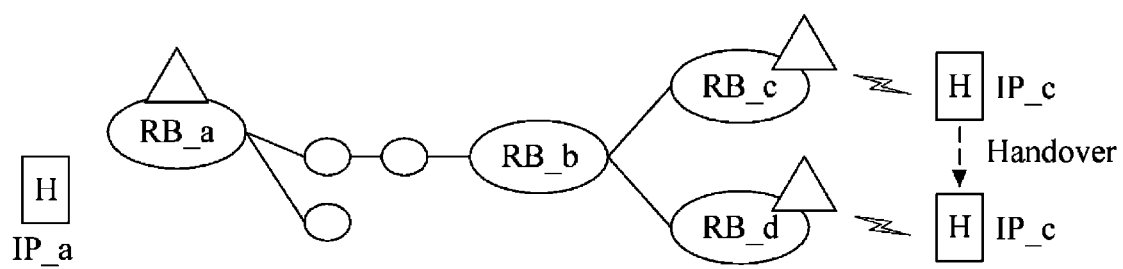
FIG. 8A and FIG. 8B are flowchart illustrating handover procedures according to an exemplary embodiment.
Figure 8B:
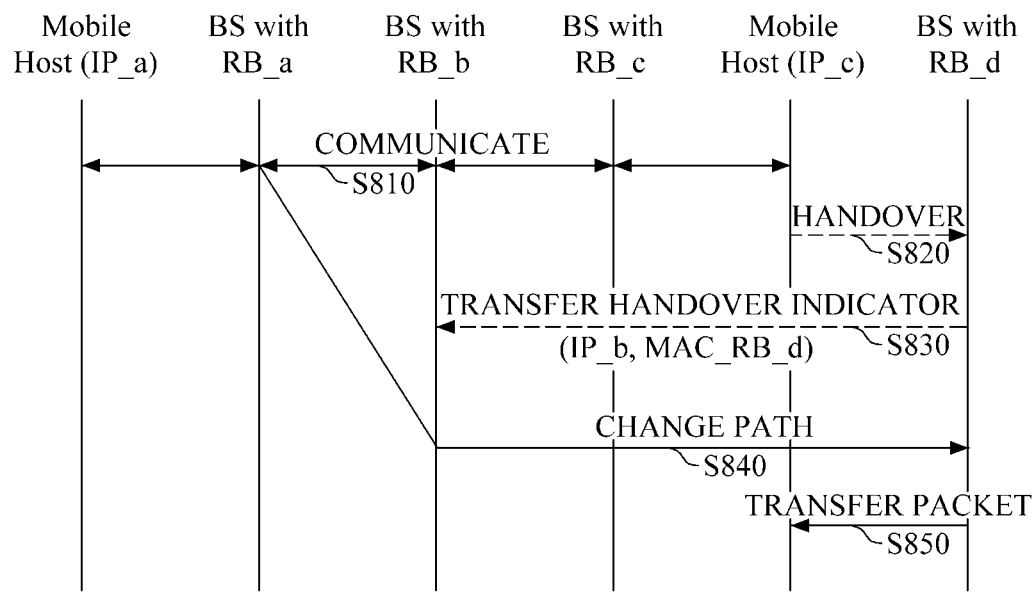

FIG. 8A and FIG. 8B are flowchart illustrating handover procedures according to an exemplary embodiment.

Referring to FIGS. 8A and 8*b*, when a mobile communication host IP_a communicates with a mobile communication host IP_c through a path of RB_a- . . . -RB_b-RB_c in S810, the mobile communication host IP_c switches an attachment point thereof from RB_c to RB_d due to handover in S820.

To minimize packet loss during handover, routing bridge RB_d transmits a handover indicator to the closest intersection of the path, i.e., RB_b to indicate the occurrence of handover in S830.

The routing bridge RB_b examines IP header of a packet to be forwarded to the RB_c, and, if the IP header indicates IP_c, forwards the packet to the routing bridge RB_d in S840. Accordingly, the path for transferring a packet from the routing bridge IP_a to the routing bridge IP_c is changed to RB_a- . . . -RB_b-RB_d. In this case, although it is assumed that the routing bridge RB_d to which handover information is moved performs signaling process, another routing bridge RB_c or the mobile communication host IP_c may perform the signaling process according to the embodiment or characteristics of the relevant wireless network. The routing bridge RB_d ultimately transfers the packet to the receiving mobile communication host IP_c in S850.

FIG. 9 is a diagram illustrating a configuration of a routing bridge apparatus according to an exemplary embodiment.

Referring to FIG. 9, the routing bridge apparatus includes a routing bridge cache 910, a communication host register 920, a packet transfer processor 930, and a packet reception processor 940.

The routing bridge cache 910 saves an IP address and link layer address of a communication host.

The communication host register 920 registers an IP address and link layer address of the routing bridge apparatus to a location server 300, as well as saving the IP address and link layer address of a communication host in the routing bridge cache.

As receiving an IP address of a first destination communication host and a first packet from a communication host, the packet transfer processor 930 obtains, from the location server 300, a link layer address of a first routing bridge apparatus to which the first destination communication host is connected, and transfers the first packet and the IP address of the first destination communication host to the first routing bridge apparatus. The packet transfer processor 930 further includes a buffer that buffers the first packet during the obtaining of the link layer address from the location server 300. The packet transfer processor 930 analyzes a prefix of the IP address of the first destination communication host, and if the analysis result shows that the IP address is external to the mobile communication network, the packet transfer processor 930 transfers the IP address of the first destination communication host and the first packet to a gateway.

When the packet reception processor 940 receives an IP address of a second destination communication host and a second packet from a second routing bridge apparatus, the packet reception processor 940 searches the routing bridge cache for a link layer address of the second destination communication host and transfers the second packet to the second destination communication host.

As a communication host is handed over to the routing bridge apparatus, the handover processor 950 transmits a handover indicator to the closest routing bridge apparatus. Furthermore, the handover processor 950 controls the communication host register to register the communication host that is handed over.

When compared to the conventional 4G mobile communication network or IP-based networking technologies, the new mobile communication network architecture based on link layer routing and the relevant procedures thereof exhibit the following advantages.

First, it is possible to increase an efficiency of packet transfer because an additional header, such as general packet radio service (GPRS) tunneling protocol (GTP), is not required, but only routing at link layer is used.

Second, because a packet is transferred not via a central anchor, such as P-GW, but through link-layer routing, it is possible to prevent various problems, such as, traffic concentration, a single failure point, or unnecessary traffic in a core network, which may be caused by a centralized anchor.

Third, it is possible to reduce the cost for an IP network configuration and router settings because IP routing is not used in a mobile communication network.

Fourth, it is possible to reduce network building cost by constructing a bridge-based network, wherein the bridge is less expensive than a router.

Fifth, an IP address is used as a locator, not as an identifier, and thus the existing IP address can be maintained during handover, thereby making it possible to ensure session continuity.

Sixth, an IP address is used as an identifier of an upper layer, so that it is possible to provide compatibility that allows the existing Internet applications to be used when a new network is established.

Seventh, link layer routing enables to reduce path re-establishment even during handover, so that it is possible to minimize packet loss or packet delay.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A routing bridge apparatus comprising:
   a routing bridge cache configured to save an IP address and link layer address of a communication host;
   a communication host register configured to register the IP address of the communication host and a link layer address of the routing bridge apparatus in a location server, as well as storing the IP address and link layer address of the communication host in the routing bridge cache;
   a packet transfer processor configured to, in response to receiving a first packet and an IP address of a first destination communication host from the communication host, obtain from the location server a link layer address of a first routing bridge apparatus to which the first destination communication host is connected, and transmit the first packet and the IP address of the first destination communication host to the first routing bridge apparatus of the obtained link layer address;
   a packet reception processor configured to, in response to receiving a second packet and an IP address of a second destination communication host from a second routing bridge apparatus, search the routing bridge cache for a link layer address of the second destination communication host, and transfer the second packet to the second destination communication host; and
   a handover processor configured to transmit a handover indicator to the closest routing bridge apparatus when the communication host is handed over to the routing bridge apparatus.

2. The routing bridge apparatus of claim 1, wherein the packet transfer processor further comprises a buffer configured to buffer the first packet while obtaining the link layer address of the first routing bridge apparatus from the location server.

3. The routing bridge apparatus of claim 1, wherein the packet transfer processor is configured to, if an analysis result of a prefix of the IP address of the first destination communication host shows that the IP address of the first destination communication host is external to a mobile communication network, transfer the first packet and the IP address of the first destination communication host to a gateway.

4. The routing bridge apparatus of claim 1, wherein the handover processor is configured to control the communication host register to register the communication host that is handed over to the routing bridge apparatus.

5. A method of handover between routing bridge apparatuses, the method comprising:

in response to a communication host being handed over from a first routing bridge apparatus to a second routing bridge apparatus, transmitting, from the second routing bridge apparatus, a handover indicator to the closest routing bridge apparatus to which both the first routing bridge apparatus and the second routing bridge apparatus are all connected, wherein the handover indicator comprises an IP address of the communication host and a link layer address of the second routing bridge apparatus; and transferring, at the closest routing bridge apparatus, a packet to be transferred to the IP address of the communication host to the second routing bridge apparatus.

6. The method of claim 5, further comprising:

registering, at the second routing bridge apparatus, the link layer address of the second routing bridge apparatus in a location server, as well as storing the IP address and link layer address of the communication host in a routing bridge cache.

\* \* \* \* \*